J. M. & M. ROHAN.
GUIDE FOR TRACTION ENGINES.
APPLICATION FILED APR. 4, 1908.
921,004.
Patented May 11, 1909.
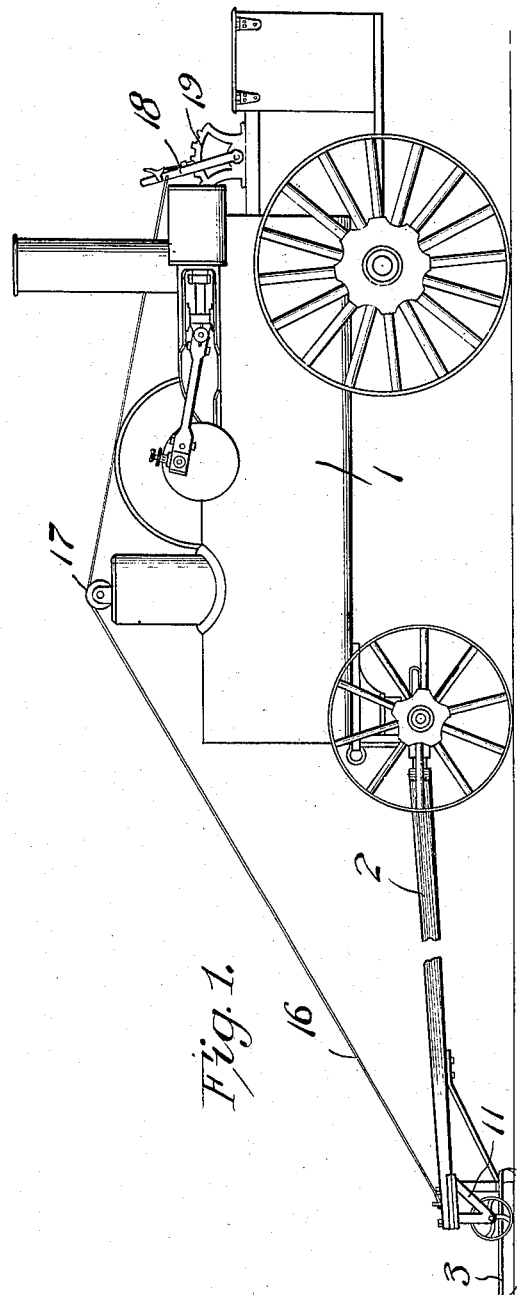
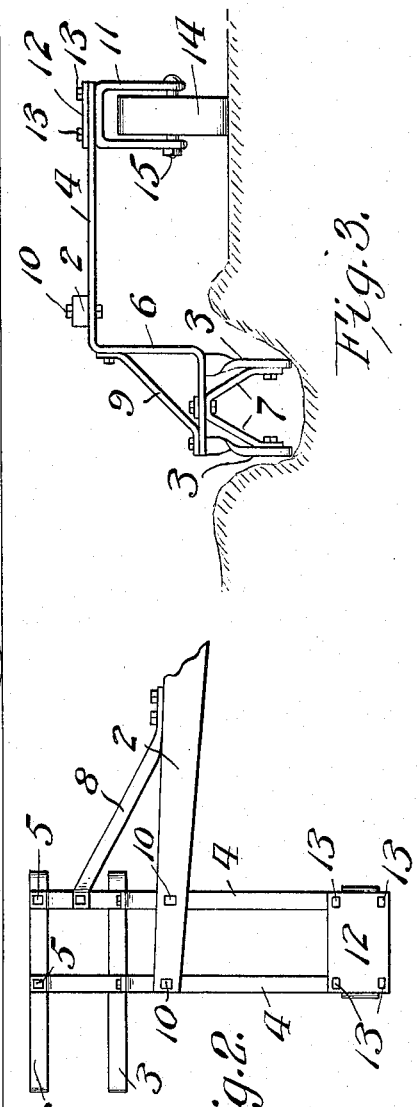
Inventor
Michael Rohan and
John M. Rohan,
By Victor J. Evans
Attorney
Witnesses
C. E. Smith

UNITED STATES PATENT OFFICE.

JOHN M. ROHAN AND MICHAEL ROHAN, OF KADOKA, SOUTH DAKOTA.

GUIDE FOR TRACTION-ENGINES.

No. 921,004.     Specification of Letters Patent.     Patented May 11, 1909.

Application filed April 4, 1908. Serial No. 425,176.

*To all whom it may concern:*

Be it known that we, JOHN M. ROHAN and MICHAEL ROHAN, subjects of the King of Great Britain and Ireland, residing at Kadoka, in the county of Stanley and State of South Dakota, have invented new and useful Improvements in Guides for Traction-Engines, of which the following is a specification.

This invention relates to guides for traction engines, and one of the principal objects of the same is to provide reliable and efficient means for guiding a traction engine and a gang of plows carried thereby across a field in a straight line.

Another object of the invention is to provide a runner connected to a beam extending from the front axle of the engine, said runner designed to run in a furrow to guide the engine and plows carried thereby across the field, means being provided for lifting the runner out of the furrow when it is desired to turn and when the machine is being carried from place to place over the ground.

These and other objects may be attained by means of the construction illustrated in the accompanying drawing, in which:—

Figure 1 is a side elevation of a traction engine provided with a guide made in accordance with our invention. Fig. 2 is a detail plan view of the guide and front end of the beam to which it is secured. Fig. 3 is a front end elevation of the guide.

Referring to the drawing for a more specific description of our invention, the numeral 1 designates a traction engine which may be of the usual or any suitable type or character, and means are provided for the connection of a gang of plows to said engine. Pivotally connected to the front axle of the engine is a forwardly extending beam 2, and connected underneath the front end of said beam is a guide comprising two runners 3 having curved front and rear ends and a horizontal upper bar preferably formed in a single piece, as shown, and connected to said guide runners is a laterally extending frame consisting of parallel bars 4 bolted at 5 to the runners and provided with a vertical portion 6 which raises the parallel bars some distance above the guide runners, as shown more particularly in Fig. 3. The runners are spaced apart by means of a V-shaped brace 7, and the guide runners are connected to the beam 2 by means of a brace 8. Braces 9 are also provided for giving the proper strength and rigidity to the guide runners. The beam 2 is connected to the parallel bars 4 by means of suitable bolts 10. Connected under the parallel bars 4 at their outer ends is a yoke 11 held in place by means of a plate 12 and bolts 13. Journaled in the yoke 11 is a ground wheel 14, the axle 15 of said wheel being passed through the arms of the yoke and through the hub of the wheel. Connected to the front part of the beam is a wire cable 16, said cable passing over a roller 17 mounted on the engine and the end of said cable is connected to a lever 18 provided with a rack 19.

The operation of our invention may be briefly described as follows: The runners 3 are placed in a furrow made by the plow at the left of the gang, and as the engine is run over the field the gang of plows carried thereby is guided in a straight path determined by the furrow and without the services of an attendant to constantly guide the engine. At the end of the furrow the guide is lifted from the ground by means of the lever 18 until the engine is turned to make another furrow. The guide is then lowered into the last furrow formed, and the machine is run across the field carrying the gang of plows after it.

From the foregoing it will be obvious that our invention is of simple construction, will operate efficiently to guide a traction engine across a field in a straight path determined by a previously formed furrow, and that the device can be readily lifted out of the furrow whenever required to turn the engine or to go from place to place.

Having thus described the invention, what is claimed as new, is:—

1. A guide for traction engines comprising a beam, a frame secured to said beam and extending laterally therefrom, a runner secured to said frame, said runner comprising parallel members spaced apart to bear against the sides of the furrow, and a land wheel mounted in a yoke connected to said frame.

2. A guide for traction engines comprising a beam, a frame connected to the beam and extending laterally therefrom, a runner connected to said frame, said runner comprising parallel members designed to run in a furrow and to bear against the sides of said furrow, a land wheel mounted in a yoke on said frame, and a flexible connection extending from the front of the beam to a lever on the traction engine for raising the runner out of the furrow.

In testimony whereof we affix our signatures in presence of two witnesses.

JOHN M. ROHAN.
MICHAEL ROHAN.

Witnesses:
F. E. REIDINGER,
A. G. FURLONG.